United States Patent [19]
Takeuchi et al.

[11] Patent Number: 5,571,640
[45] Date of Patent: Nov. 5, 1996

[54] CATHODE COMPONENT FOR USE IN ELECTROCHEMICAL CELLS

[75] Inventors: Esther S. Takeuchi, East Amherst; Ralph T. Mead, Kenmore; Clifford J. Post, Amherst, all of N.Y.

[73] Assignee: Wilson Greatbatch Ltd., Clarence, N.Y.

[21] Appl. No.: 435,728

[22] Filed: May 5, 1995

Related U.S. Application Data

[63] Continuation-in-part of Ser. No. 146,707, Nov. 1, 1993, Pat. No. 5,435,874.

[51] Int. Cl.$^6$ .................................................. H01M 4/02
[52] U.S. Cl. ..................... 429/209; 429/217; 429/219; 429/220; 429/221; 429/223; 429/224; 429/218; 429/232; 429/241
[58] Field of Search ..................... 429/217, 219, 429/220, 221, 223, 224, 218, 232, 241, 209; 264/104, 105; 427/58, 77, 209

[56] References Cited

U.S. PATENT DOCUMENTS

| | | | |
|---|---|---|---|
| 4,161,063 | 7/1979 | Goebel et al. | 29/623.5 |
| 4,179,799 | 12/1979 | Fritts | 29/623.5 |
| 4,310,609 | 1/1982 | Liang et al. | 429/194 |
| 4,324,828 | 4/1982 | Ebato et al. | 429/218 |
| 4,448,605 | 5/1984 | Mizuhara | 75/123 |
| 4,556,618 | 3/1985 | Shia | 429/217 |
| 4,812,376 | 3/1989 | Rudolph | 429/101 |
| 4,830,940 | 5/1989 | Keister et al. | 429/194 |
| 4,956,247 | 9/1990 | Miyazaki et al. | 429/194 |
| 5,041,199 | 8/1991 | DiFranco | 429/217 |
| 5,158,722 | 10/1992 | Ilic et al. | 429/217 |

*Primary Examiner*—Kathryn Gorgos
*Attorney, Agent, or Firm*—Hodgson, Russ, Andrews, Woods & Goodyear LLP

[57] ABSTRACT

A cathode produced from a new process for manufacturing a cathode component from a free-standing sheet of cathode material, is described. The process comprises a first step of adjusting the particle size of the cathode active material to a useful size followed by mixing with binder and conductive additives suspended in a suitable solvent to form a paste. The paste is then fed into a series of roll mills to form the sheet material, or the paste can first be pelletized before the rolling step. The cathode sheet material is dried and punched into cathode plates having a myriad of geometric shapes suitable for cathode preparation by compressing a current collector between two plates of the cathode material.

17 Claims, 5 Drawing Sheets

FIG. 5

CATHODE COMPONENT FOR USE IN ELECTROCHEMICAL CELLS

CROSS-REFERENCE TO RELATED APPLICATIONS

This is a continuation-in-part of application Ser. No. 08/146,707, filed Nov. 1, 1993, now U.S. Pat. No. 5,435,874.

BACKGROUND OF THE INVENTION

1. Field of Invention

This invention relates to the art of electrochemical cells and more particularly to a method for manufacturing a cathode component for use in an electrochemical cell from a free-standing structure of cathode active material. Preferably, the free-standing structure of cathode active material comprises a metal-containing material that is intercalatable with metal ions from the anode after being press laminated onto a current collector.

2. Prior Art

It is known to form cathodes of metal oxides and mixed metal oxides, such as silver vanadium oxide cathode material, by a pressing process that requires powder mix charges to be manually spread into press fixture cavities. The prior art process is illustrated in the block diagram flow chart in FIG. 1 and begins with introducing the cathode material as a dry granular admixture comprising conductive diluents and a suitable binder material into press platens or fixtures 12. The loaded fixtures are then placed in a hydraulic press which compresses the cathode admixture into cathodes plates for use in an electrochemical cell, as is known to those of ordinary skill in the art.

Figure 1:
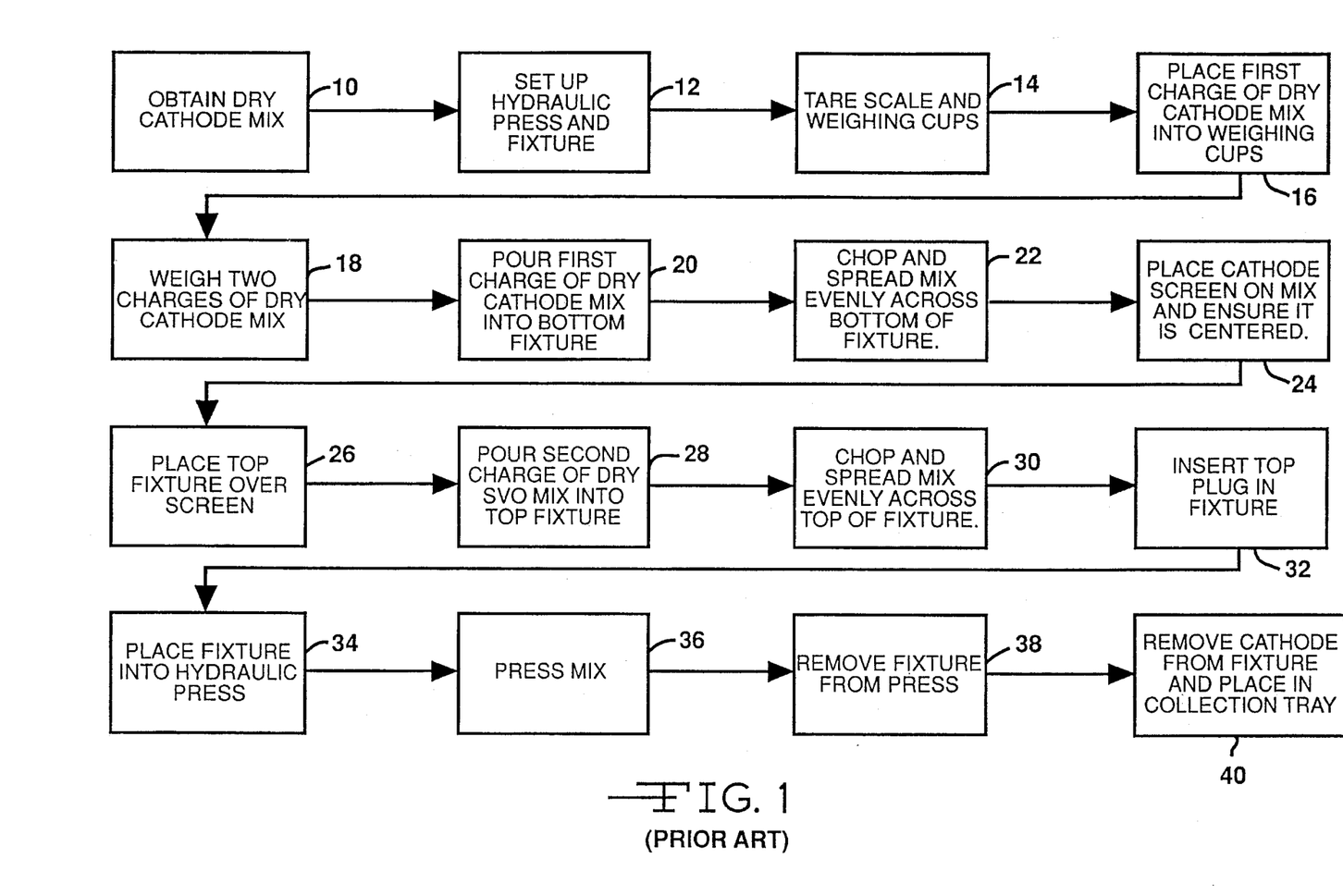
FIG. 1 is a block diagram and flow chart illustrating the steps involved in making a cathode plate according to the prior art method.

More particularly, receptacle cups for the cathode admixture are first weighed on a tare scale 14 and then filled with the dry cathode material 16. Two charges of the cathode material 18 are weighed in this manner and a first weighed charge is loaded into a bottom press fixture 20. This requires an operator to chop and spread the cathode material to form an even consistency throughout the fixture 22. A suitable current collector is placed on top of the dry powder cathode admixture centered in the fixture 24.

A top fixture is then positioned on the bottom fixture, ready to receive a second weighed charge of the cathode material 28. Again, the second charge must be chopped and spread evenly in the top fixture 30 to ensure uniform distribution therein. A plug is positioned on top of the second cathode charge to close the fixture assembly 32 and the assembly is placed into the hydraulic press 34. The compressed dry charges of cathode material, having the intermediate current collector sandwiched therebetween 36, form a cathode component suitable for use in an electrochemical cell.

After pressing is completed, the fixture assembly is removed from the hydraulic press 38 and separated from the cathode component. The newly pressed cathode component is then placed in a collection tray 40 ready for assembly into a high energy density electrochemical cell, as is well known to those of ordinary skill in the art.

There are several problems associated with this prior art manufacturing process including dust generated as a result of handling the dry cathode mix. This cathode dust being airborne represents material loss which may need to be replenished. Additionally, the step of chopping and spreading the dry cathode material admixture loaded into the fixture cavities adds significantly to the process time required to make a cathode component. If this step is not carried out properly, the resulting cathode plate will have a non-uniform density or unit weight, which can detract from the performance of the electrochemical cell.

U.S. Pat. No. 4,956,247 to Miyazaki et al. describes a process for making a positive electrode for use in a secondary electrochemical cell comprising a mixture of a metal oxide or a mixed metal oxide material having an average particles size of up to 3 μm, a conductive agent such as acetylene black, and a binder such as a powder fluoro-resin. These ingredients are kneaded into an admixture with an organic solvent to form a paste that is subsequently formed into a cathode sheet by moving the paste through a roll mill followed by drying. A coupon is cut out of the resulting sheet and bonded to a stainless steel plate by means of a conductive adhesive containing carbon to thereby form the positive electrode.

This prior art process requires the use of the conductive adhesive to bond the cathode sheet material to the current collector. The adhesive may detract from the cell performance and the adhesive represents an additional manufacturing step that is not needed in the process of the present invention.

In the present invention, a cathode current collection is laminated between at least one shaped cathode structure pressed on each side of the current collector. This is accomplished without the use of conductive adhesives so that in the present invention the cathode structures are in direct contract with the current collector. The compression of the cathode structures onto the current collector provides the needed electrical contact rather than the use of an adhesive.

U.S. Pat. No. 4,536,618 to Shia discloses a sheet process for fluorinated carbonaceous cathode materials. Carbonaceous cathode active materials are organic materials, and as such, they are relatively soft in comparison to the metal-containing cathode active materials of the present invention. For that reason, it is critically necessary for Shia to mix the carbonaceous cathode active material with a volatile, substantially nonpolymeric, pore forming solvent to form the paste. It is the step of removing the solvent, by evaporation, from the paste that imparts the necessary porosity to the cathode sheet. More accurately, the removed solvent provides permeability to the cathode sheet that enables the metal ions produced by oxidation of the anode to intercalate therein. However, in Shia, the cathode sheet material is not intended to be incorporated into a cathode component by being pressed onto a current collector. Such a final pressing step, after the pore forming solvent has been removed from the cathode sheet, would destroy the permeability of the cathode sheet. The relatively soft carbonaceous material would tend to compact to a tight, impermeable mass not intercalatable with metal ions produced by the anode.

U.S. Pat. No. 4,161,063 to Goebel et al. discloses a method of preparing a cathode structure for use in an electrochemical cell. The preferred composition of the cathode material comprises up to 30 weight percent of graphite, 65 to 99 weight percent of carbon black and 1 to 10 percent of a fluorocarbon polymer mixed with a 50% isopropyl solution in water. The resulting dough is extruded in a spaghetti-like form that is chopped into a plurality of discrete porous conglomerates. The conglomerates are then pressed onto both sides of the substrate serving as a current collector to form the cathode structure. In the Goebel et al. method for making a cathode for an electrochemical cell, the step of chopping is critically important in order to provide the resulting cathode component with the requisite "fluid conducting channels" so that the metal ions produced by the anode are able to intercalate therein. Without these channels, the resulting cathode component would not be suitable for use as an electrode in the electrochemical cell.

In the present invention, there is no need for the solvent material to act as a pore-forming agent or for the cathode structure to be chopped into conglomerates and then pressed onto a current collector. Instead, the inherently rigid nature of the metal-containing cathode active material of the present invention provides the necessary interstitial space, even after press lamination of the cathode structure onto the current collector, for intercalation of the metal ions produced by oxidation of the anode during electrochemical discharge. Thus, the present cathode material is pressable into a cathode structure without the need for the solvent to serve as a propant to prevent destruction of the cathode material's permeability and without having to impart permeability to the cathode material in a comminuting step.

OBJECTS

It is, therefore, an object of the present invention to provide an improved cathode component for use in an electrochemical cell, wherein the cathode component is made from a free-standing structure of cathode active material.

It is another object to provide an improved process for manufacturing a cathode component from a free-standing structure of cathode active material having a uniform unit weight throughout.

Still another object is to provide a cathode component made from an improved free-standing structure of cathode active material that can be cut or punched into various geometric shapes and laminated on a cathode current collector for use in an electrochemical cell.

Finally, another object is to provide a cathode component made from a free-standing structure of cathode active material that has a uniform cross-sectional thickness throughout and which thickness can be made relatively thin.

SUMMARY OF INVENTION

The present invention relates to a new and improved method of preparing a laminated cathode component made from a cathode structure, for example, in the form of a sheet material and useful in high energy density electrochemical cells. The present method comprises taking granular cathode active starting material and comminuting the cathode material to reduce the particle size. The ground cathode material is mixed with conductive diluents and a suitable binder material and suspended in a solvent to form a depolarizer admixture in the form of a paste. The depolarizer admixture is then fed into rollers to form briquettes, and the briquettes are gravity fed to roll mills to produce structures of the cathode material, such as in a sheet form. Alternatively, the depolarizer admixture can be fed directly into the roll mills. The cathode sheet material is then cut into cathode plates having a variety of geometric shapes that allow for the assembly of variously shaped cathode components by laminating a cathode current collector between at least one cathode blank pressed on either side of the current collector. This is done without the use of conductive adhesives, and the resulting cathode components are useful in electrochemical cells having a variety of geometric forms.

BRIEF DESCRIPTION OF THE DRAWINGS

These and other objects will become increasingly more apparent to those of ordinary skill in the art by reference to the following detailed descriptions taken in conjunction with the accompanying drawing, in which.

DETAILED DESCRIPTION OF THE INVENTION

The method of the present invention comprises taking an already prepared cathode active starting material comprising a metal oxide or a mixed metal oxide, such as silver vanadium oxide, preferably present in a granular form and manufacturing a free-standing cathode structure, as such a sheet, for use in an electrochemical cell. Carbonaceous cathode materials are also useful as starting materials for forming cathode components by the process of the present invention. The cathode starting material can be made by the chemical addition, reaction, or otherwise intimate contact of various metal oxides, mixed metal oxides and/or metal elements during thermal treatment, sol-gel formation, chemical vapor deposition or hydrothermal syntheses in mixed states, as is well known to those of ordinary skill in the art. Examples of cathode materials that may be formed into a cathode sheet according to the present invention include silver vanadium oxide (SVO), copper silver vanadium oxide (CSVO), carbon manganese dioxide, fluorinated carbon, titanium disulfide, cobalt oxide, nickel oxide, copper vanadium oxide, copper sulfide, iron sulfide, iron disulfide, and other cathode materials including mixtures thereof, typically used in lithium anode cells. The inherently rigid nature of these metal-containing materials provides them with interstitial spacing sufficient to provide for intercalation of metal ions generated by the anode during electrical discharge of the cell.

Figure 2:
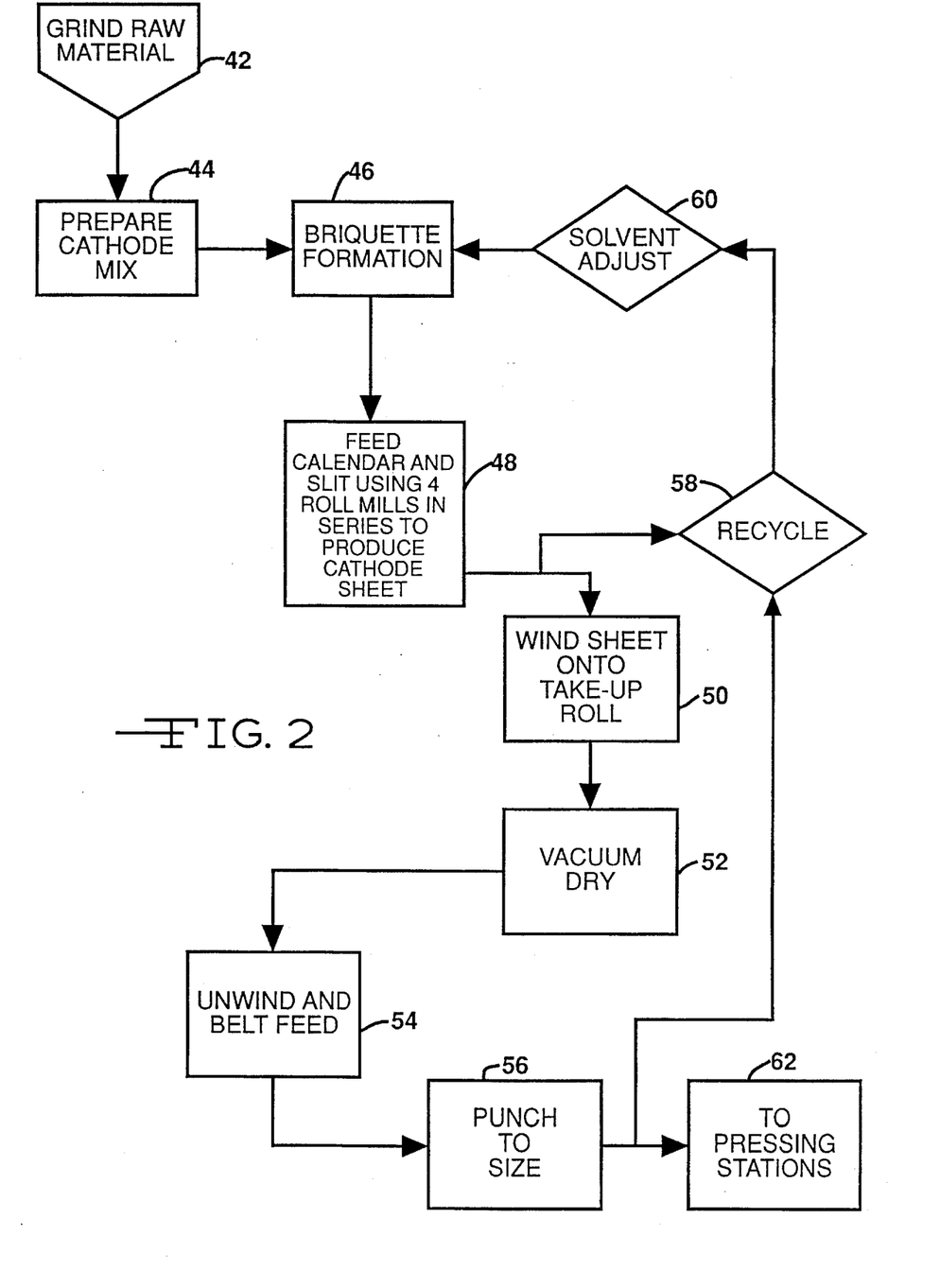
FIG. 2 is a block diagram and flow chart illustrating the steps involved in making a free-standing sheet of cathode material according to the present invention.

As illustrated in the block diagram flow chart in FIG. 2, the method of the present invention starts by taking granular cathode active material and adjusting the particle size to a useful range. This is done by comminuting the cathode material in an attrition or grinding step 42 to reduce the particle size. A ball mill or vertical ball mill is preferred and typical grinding time ranges from between about 10 to 15 minutes. The finely divided cathode material is preferably mixed with carbon black and/or graphite as conductive diluents and a powder fluoro-resin such as polytetrafluoroethylene powder as a binder material to form a depolarizer cathode admixture in the step designated 44. Preferably, the admixture comprises about 3 weight percent of the conductive diluents and about 3 weight percent of the binder material. This is typically done in a solvent of either water or an inert organic medium such as mineral spirits. The mixing process provides for the fibrillation of the fluororesin to ensure material integrity. In some cases, no electronic conductor material is required and the percent cathode active material is preferably held between about 80 percent to about 99 percent. After mixing sufficiently to ensure homogeneity in the admixture, the cathode admixture is removed from the mixer as a paste.

Following the mixing step, the admixture paste can be fed into a series of roll mills that compact the cathode material into a thin sheet having a tape form, or the cathode admixture first can be run through a briquette mill in the step designated 46. In the latter case, the cathode admixture is formed into a suitable structure such as small pellets which are then fed into the roll mills.

Typically, the compacting step 48 is performed by roll mills comprising two to four calendar mills that serve to press the admixture between rotating rollers to provide a free-standing sheet of the cathode material as a continuous tape. The cathode tape preferably has a thickness in the range of from between about 0.004 inches to about 0.020 inches. The outer edges of the tape leaving the rollers is trimmed and wound up on a take-up reel as indicated at 50 to form a roll of the cathode material that is subsequently subjected to a drying step under vacuum conditions. The drying step serves to remove any residual solvent and/or water from the cathode material. Alternatively, the process can include dropwise addition of liquid electrolyte into the cathode mixture prior to rolling to enhance the performance and rate capacity of an assembled electrochemical cell incorporating the cathode material.

The cathode material can be stored for later use, or unwound and fed on a conveyor belt as shown at 54 to a punching machine. The punching operation 56 forms the continuous tape of cathode material into any dimension needed for preparation of a cathode component for use in a high energy density electrochemical cell, as is well known by those of ordinary skill of the art.

As shown in FIG. 2, the method of the present invention contains several feedback loops that serve to recycle the cathode active material should the quality control not be up to an acceptable level. This contributes to the process yield as very little cathode material is actually lost to waste. After the cathode admixture is pressed during step 48 by the series of calendar mills, if the resulting tape is too thin or otherwise of insufficient quality, the tape is sent to a recycler, indicated as step 58 that reintroduces the cathode material into the feed line entering the calendar mills. If needed, the solvent concentration is adjusted during step 60 as needed to provide a more uniform consistency to the cathode admixture paste for rolling into the cathode tape. This first recycle step 58 is also useful for reintroducing trimmings and similar leftover cathode material back into the feed line entering the calendar mills.

A second recycle loop removes the cathode material from the process after the punching operation and feeds back into the calendar mills, through the recycler indicated in step 58 and the briquette mill in step 46, if that latter step is included in the process, as previously discussed. Again, the solvent concentration is adjusted during step 60 to produce a paste that is suitable for rolling into a tape of uniform cross-sectional thickness.

Upon completion of the drying step 52, the tape of cathode material can be stored for later use, or immediately sent to a punching operation 56. The punching operation serves to cut the sheet material into cathode plates having a variety of shapes including strips, half-round shapes, rectangular shapes, oblong pieces, or others, that are moved during step 62 to a pressing station for fabrication of a cathode component for use in a high energy density electrochemical cell, as will presently be discussed in detail.

Figure 3:
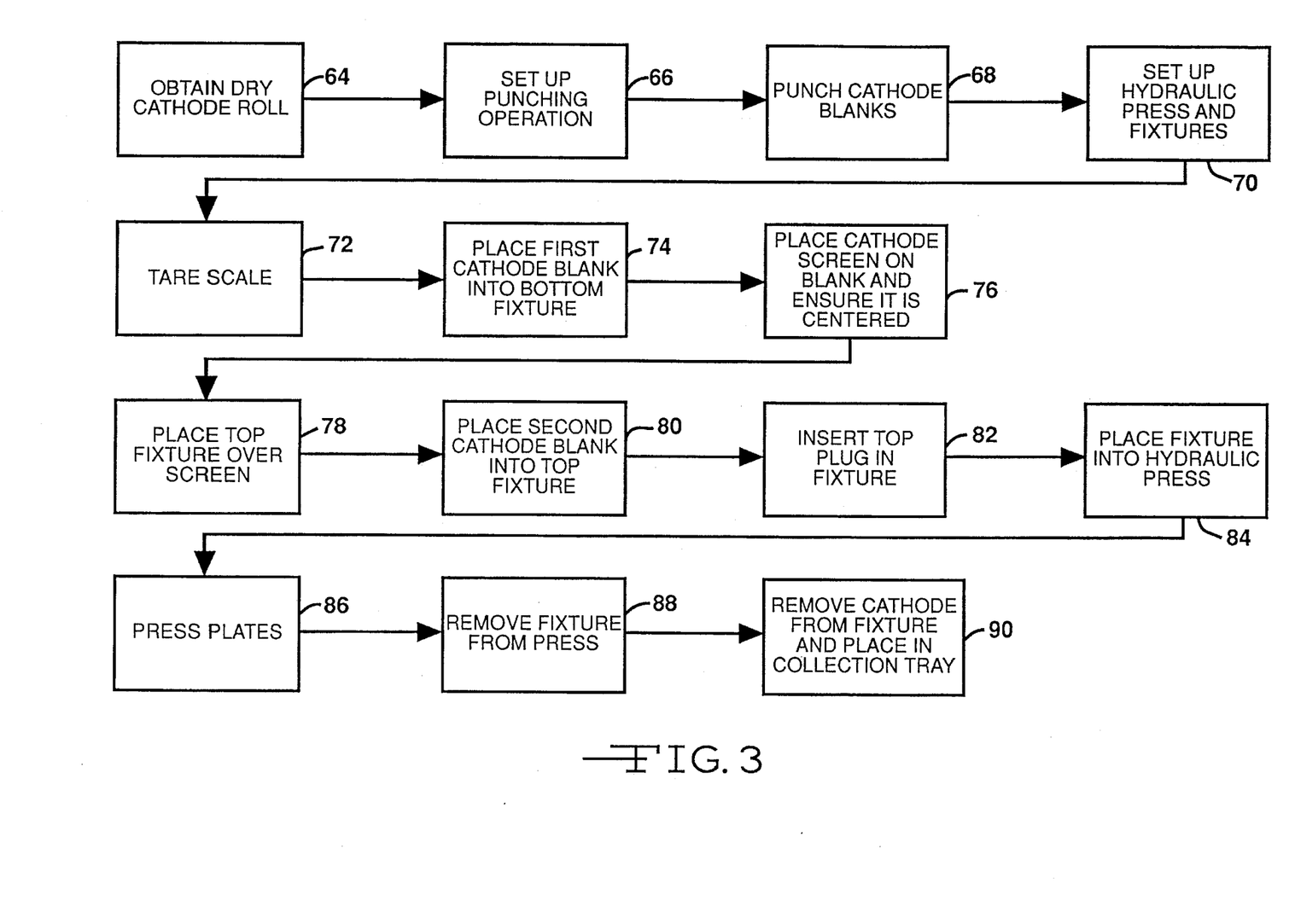
FIG. 3 is a block diagram and flow chart illustrating the steps involved in manufacturing a cathode component for use in an electrochemical cell from a free-standing sheet of cathode material made according to the method of the present invention.

As illustrated in the block diagram flow chart shown in FIG. 3, the punching operation provides for turning the continuous tape of cathode material into cathode plates having any geometric dimension needed for preparation of a cathode component. Thus, during the cathode pressing process, a roll of dry cathode material is obtained during step 64 for operation thereon. The punching machine, which is of a commercially available type, is set up during step 66 to produce the desired geometric form and the tape of cathode material is run through the punching machine to form cathode plates or blanks during step 68.

A hydraulic press having platens or fixtures is provided at 70. Receptacle cups for the punched cathode plates are weighted on a tare scale during step 72 and as quality control check, selected ones of the cathode plates are weighted to insure cross-sectioned uniformity. To build a cathode component, a first plate is placed in a bottom fixture during step 74 and a cathode current collector, such as an expanded metal screen, is placed on top of the plate during step 76. A top press fixture is then positioned on the bottom fixture and over the current collector screen as indicated at 78. This fixture receives a second shaped cathode plate during step 80 followed by a top plug during step 82 which closes the fixture assembly. The fixture assembly is then inserted into the hydraulic press as indicated at 84 which compresses the two cathode plates together 86 with the cathode current collector sandwiched therebetween to form the cathode component as a laminate.

The inherently rigid nature of the metal-containing material comprising the cathode active material of the cathode plates retains the necessary interstitial space for intercalation of the metal ions produced during oxidation of the anode during discharge of the cell, even after being press laminated onto current collector. Thus, the present process does not require a propant agent for the cathode active material during the pressing step.

Following the pressing step, the fixture assembly is removed from the press during step 88 and the cathode component is separated from the press fixture and placed into a collection tray during step 90. The cathode component can then be stored for later use, or the cathode can be incorporated into a high energy density electrochemical cell, as is well known to those of ordinary skill in the art.

In that respect, a cathode component prepared by the method of the present invention can be used, as for example, in a nonaqueous electrochemical cell as described in U.S. Pat. No. 4,830,940 to Keister et al., which patent is assigned to the assignee of the present invention and which patent is incorporated herein by reference. The electrochemical cell can also contain an anode of a metal selected from Group IA of the Periodic Table of Elements, including lithium, sodium, potassium, etc., preferably lithium, and their alloys and intermetallic compounds, for example Li-Si, Li-Al, Li-B and Li-Si-B alloys and intermetallic compounds. The form of the anode may vary, but typically the anode is in the form of a thin sheet or foil of the anode metal, and a current collector having an extended tab or lead affixed to the anode sheet or foil.

The high energy density electrochemical cell also contains a nonaqueous electrolyte which preferably comprises a combination of a lithium salt and an organic solvent, and a separator material that electrically insulates the anode from the cathode with sufficient porosity to allow for electrolyte flow therethrough. Suitable materials for such a separator include glass non-woven, polytetrafluoroethylene or polypropylene membranes that isolate the active components from each other without impeding the free flow of ions therethrough.

Figure 4:
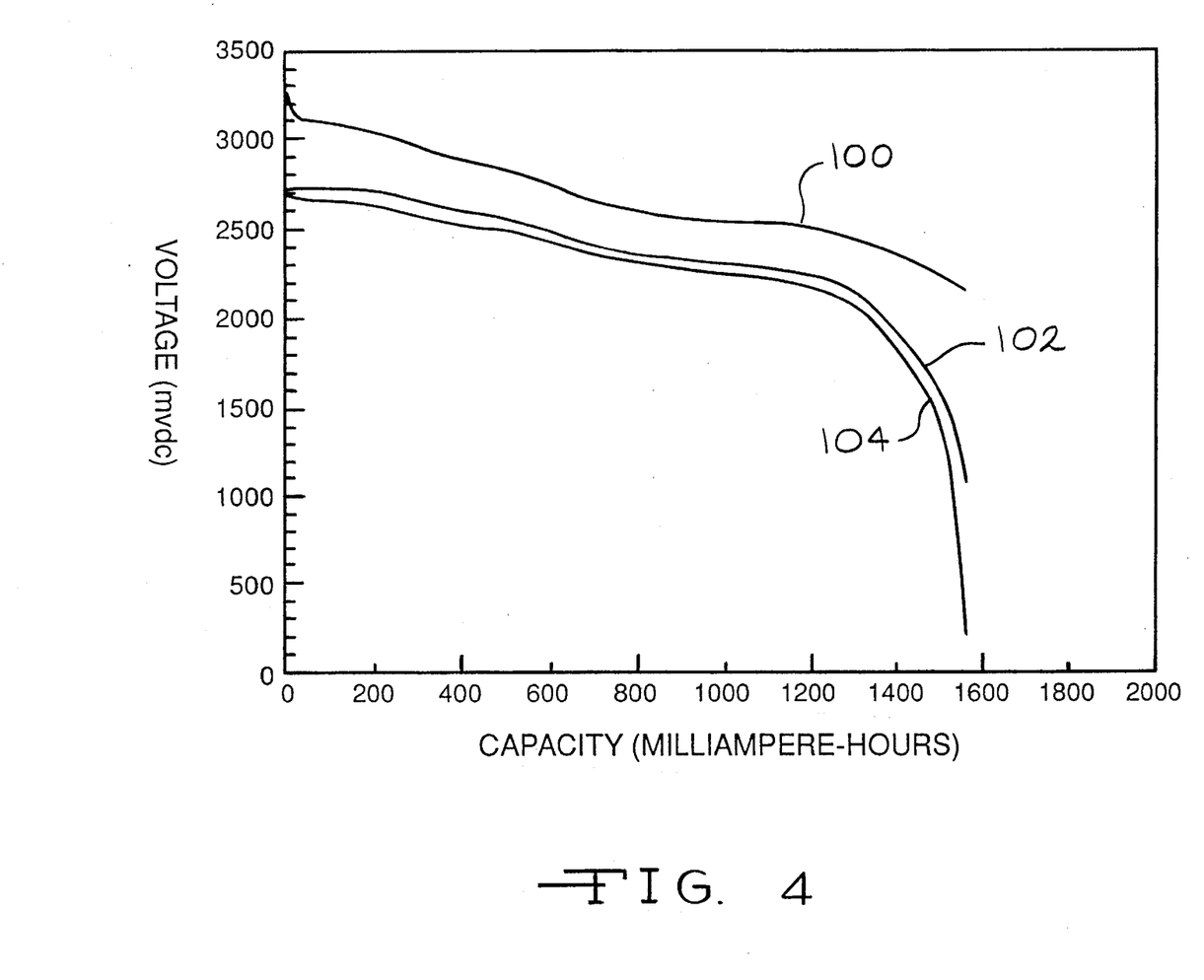
FIG. 4 is a graph showing the discharge curves of an electrochemical cell containing a cathode component comprising a laminate of silver vanadium oxide plates made according to the prior art dry powder pressing process.
Figure 5:
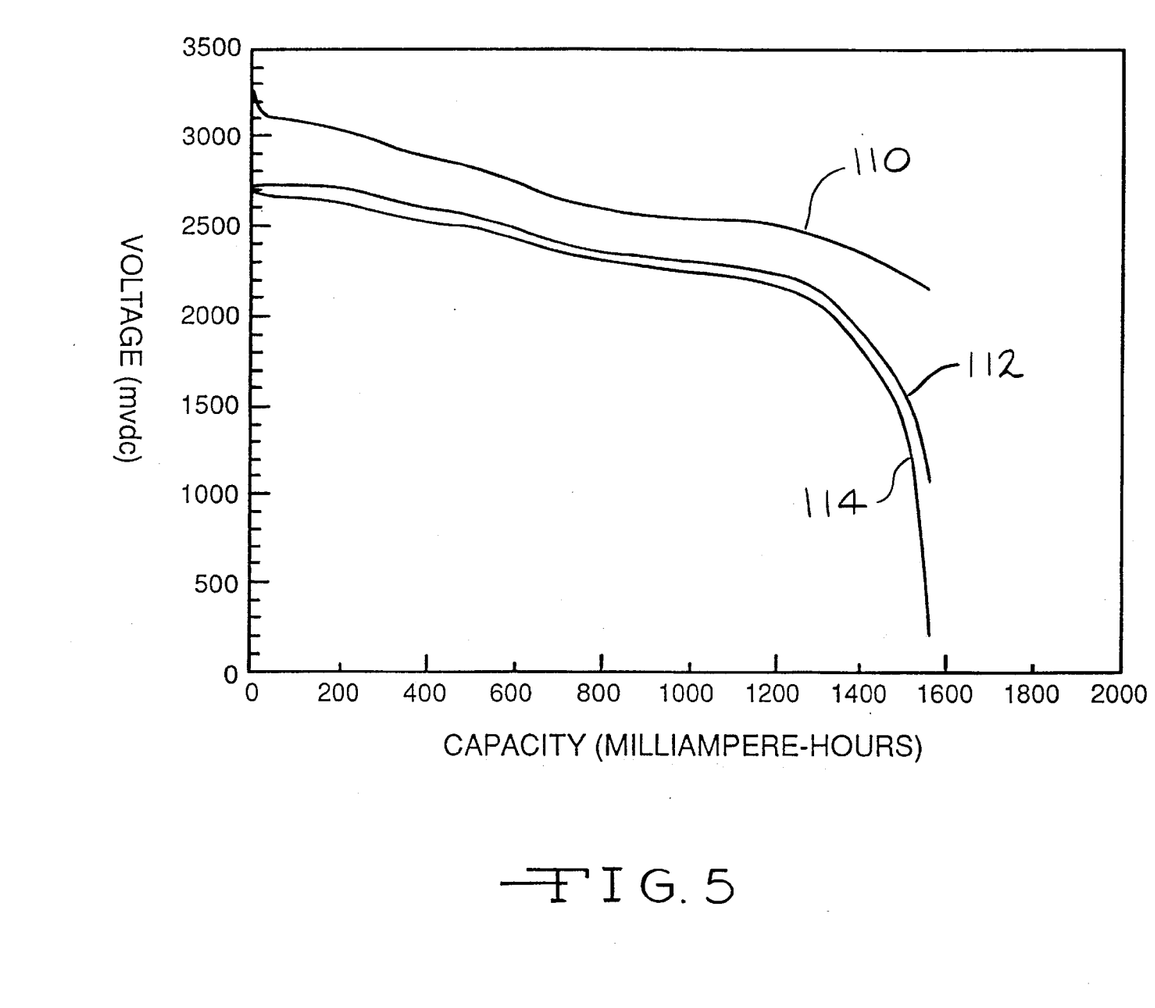
FIG. 5 is a graph showing the discharge curves of an electrochemical cell containing a cathode component laminate comprising silver vanadium oxide plates cut from sheet material made in accordance with the method of the present invention.

FIGS. 4 and 5 illustrate discharge curves from electrochemical cells constructed in a manner similar to that described in the previously mentioned Keister et al. patent and having eight cathode plates, each sealed in a polypropylene separator, and a single lithium anode strip sealed in a polypropylene separator and snaked between the cathode plates. The cathode plates were connected in parallel to a terminal pin, and the anode was connected to the cell case. The cells where vacuum filled with electrolyte consisting of 1M lithium hexafluoroarsenate in a 50/50 mixture, by volume, of dimethoxyethane (DME) and propylene carbonate (PC). The cells were cathode limited and had a stoichiometric capacity of 1.8 ampere hours.

The cell in FIG. 4 had cathode component made according to the prior art dry powder pressing process and the cell in FIG. 5 was made according to the present rolled cathode paste process, respectively. In particular, the high energy density cell of FIG. 4 contained a cathode component laminate comprising silver vanadium oxide (SVO) made by manually spreading a dry powder mix charge of SVO material into a press fixture cavity, and applying pressure to the powder to form a cathode plate, as previously discussed with respect to the prior art process. The high energy density cell of FIG. 5 contained silver vanadium oxide cathode material made from a paste or dough-like admixture comprising ground cathode active material, conductive diluents and binder material that is formed into a tape of cathode material according to the improved method of the present invention. The cathode tape is then cut into plates having the appropriate shapes and pressed against a current collector for forming a laminated cathode component, as previously described in detail.

The discharge curves were recorded by applying four ten-second, 1.5 ampere pulses every 15 seconds repeated every 30 minutes to the respective cells wherein in FIG. 4, curve 100 was recorded at open circuit with no load, curve 102 was constructed from the minima of the first pulse of each train and curve 104 was constructed from the minima of the fourth pulse of each train. In comparison, FIG. 5 shows a high energy density cell having a silver vanadium oxide cathode made according to the method of the present invention wherein curve 110 was recorded at open circuit with no load, curve 112 was constructed from the minima of the first pulse of each pulse train and curve 114 was constructed from the fourth pulse minima of each pulse train. The latter cell of the present invention shows no loss in cell performance. When viewed in conjunction with the previously discussed improvements in handling during the manufacture, the cathode sheet process of the present invention represents a significant improvement over the prior art process.

It is intended that the foregoing description only be illustrative of the present invention and that the invention is limited only by the hereinafter appended claims.

What is claimed is:

1. A cathode means which is operatively associated with an anode means in an electrochemical cell wherein upon discharge, the anode means is electrochemically oxidized to form metal ions, and wherein electron flow is generated in an external electrical circuit connected to the cell by intercalation of the metal ions into a cathode active material comprising the cathode means, the cathode means comprising:

at least one cathode structure characterized as having been calendared into a shape from a paste comprising a metal-containing material as the cathode active material mixed with a solvent material, and after removal of the solvent material, the calendared cathode structure is characterized as having been pressed onto at least one side of a perforated current collector means to provide a laminated cathode component as the cathode means with the metal-containing material providing interstices substantially uniformly distributed throughout the cathode structure, and wherein the interstices provide for intercalation of the metal ions formed by the anode means to generate the electron flow in the external electric circuit.

2. The cathode of claim 1 wherein the paste comprises from between about 80 weight percent to about 99 weight percent of the cathode active material comprising the metal-containing material.

3. The cathode of claim 1 further comprising binder and conductor materials.

4. The cathode means of claim 1 wherein the paste comprises about 3 weight percent carbon, about 3 weight percent of a fluoro-resin powder and about 94 weight percent of the cathode active material comprising the metal-containing material.

5. The cathode of claim 1 wherein the cathode active material is selected from the group consisting of a metal oxide, a metal sulfide, a mixed metal oxide and a metal element, and mixtures thereof.

6. The cathode means of claim 1 wherein the cathode active material is selected from the group consisting of silver vanadium oxide, copper silver vanadium oxide, manganese dioxide, titanium disulfide, cobalt oxide, nickel oxide, copper sulfide, iron sulfide, iron disulfide, and copper vanadium oxide, and mixtures thereof.

7. The cathode of claim 1 wherein the cathode structure is a sheet having a thickness in the range of from between about 0.004 inches to about 0.020 inches.

8. The cathode means of claim 1 wherein at least one cathode structure is pressed onto each side of the perforated current collector means and wherein the perforations provide for locking the cathode structures together.

9. A nonaqueous electrochemical cell having a cathode means, an anode means and an ionically conductive electrolyte solution associated with the anode means and the cathode means, wherein the anode means is electrochemically oxidized to form metal ions in the cell upon discharge, and wherein electron flow is generated in an external electrical circuit connected to the cell by intercalation of the metal ions into a cathode active material comprising the cathode means, the cathode means comprising:

at least one cathode structure characterized as having been calendared into a shape from a paste comprising a metal-containing material as the cathode active material mixed with a solvent material, and after removal of the solvent material, the calendared cathode structure is characterized as having been pressed onto at least one side of a perforated current collector means to provide a laminated cathode component as the cathode means with the metal-containing material providing interstices substantially uniformly distributed throughout the cathode structure, and wherein the interstices provide for intercalation of the metal ions formed by the anode means to generate the electron flow in the external electrical circuit connected to the electrochemical cell.

10. The electrochemical cell of claim 9 wherein the paste comprises about 3 weight percent carbon, about 3 weight percent of a powder fluoro-resin, and about 94 weight percent of the cathode active material comprising the metal-containing material.

11. The electrochemical cell of claim 9 wherein the cathode active material is selected from the group consisting of a metal oxide, a metal sulfide, a mixed metal oxide and a metal element, and mixtures thereof.

12. The electrochemical cell of claim 9 wherein the cathode active material is selected from the group consisting of silver vanadium oxide, copper silver vanadium oxide, manganese dioxide, titanium disulfide, cobalt oxide, nickel oxide, copper sulfide, iron sulfide, iron disulfide, and copper vanadium oxide, and mixtures thereof.

13. The electrochemical cell of claim 9 wherein the paste further comprises binder and conductor materials.

14. The electrochemical cell of claim 9 wherein the cathode structure is a sheet having a thickness in the range of from between about 0.004 inches to about 0.020 inches.

15. The electrochemical cell of claim 9 wherein the paste comprises from between about 80 weight percent to about 99 weight percent of the cathode active material comprising the metal-containing material.

16. The electrochemical cell of claim 9 wherein the anode means comprises lithium.

17. The electrochemical cell of claim 9 wherein at lease one cathode structure is pressed onto each side of the perforated current collector means and wherein the perforations provide for locking the cathode structures together.

* * * * *